3,449,442
2,4-DIPHENOXYBROMOBENZENE AND 2,4-DI-PHENOXYCHLOROBENZENE AS NEW COMPOUNDS AND SYNTHETIC LUBRICANTS

Albert L. Williams, Hopewell Township, Mercer County, N.J., assignor to Mobil Oil Corporation, a corporation of New York
No Drawing. Continuation-in-part of application Ser. No. 517,838, Dec. 30, 1965. This application Nov. 13, 1967, Ser. No. 682,516
Int. Cl. C07c 43/20, 43/22
U.S. Cl. 260—613      1 Claim

ABSTRACT OF THE DISCLOSURE 2,4-diphenoxybromobenzene and 2,4-diphenoxychlorobenzene are new compounds. They are useful as synthetic lubricants. They are also useful in preparing nonlinear polyphenyl ether synthetic lubricants, as is disclosed in copending application Ser. No. 682,520, filed concurrently herewith, by Albert L. Williams and Robert E. Kinney and entitled "Nonlinear Polyphenyl Ether Synthetic Lubricants," which is a continuation-in-part of copending application Ser. No. 517,812, filed Dec. 30, 1965 and now abandoned.

CROSS-REFERENCES TO RELATED APPLICATIONS

This application is a continuation-in-part of copending application Ser. No. 517,838, filed Dec. 30, 1965 and now abandoned.

BACKGROUND OF THE INVENTION

Field of the invention

This invention is concerned with novel 2,4-diphenoxyhalobenzenes.

Description of the prior art

Insofar as is now known the compounds of this invention have not been described in the prior art.

SUMMARY OF THE INVENTION

This invention provides, as new compounds, 2,4-diphenoxybromobenzene and 2,4-diphenoxychlorobenzene.

DESCRIPTION OF PREFERRED EMBODIMENTS

Meta-diphenoxybenzene can be monobrominated or monochlorinated to form 2,4-diphenoxybromobenzene or 2,4-diphenoxychlorobenzene in 100 percent yield. The bromination or chlorination reaction can be carried out by conventional methods at room temperatures, with or without the use of well-known halogenation catalysts. When the stoichiometric amount of bromine or chlorine for monohalogenation is used, all halogenation occurs in the 1-position and no isomers are formed.

The following examples demonstrate a typical preparation of the compounds of this invention.

EXAMPLE 1

A solution of 190 g. (0.725 mole) meta-diphenoxybenzene (prepared by the method of Example 1 of copending application Ser. No. 490,072, filed Sept. 24, 1965) was prepared by stirring with 400 ml. benzene at room temperature, in a glass reaction vessel equipped with a reflux condenser and dropping funnel. With stirring at room temperature, a solution of 116 g. (0.725 mole) bromine in 400 ml. benzene was added slowly over a period of three hours. The reaction mixture was then allowed to stand for 17 hours (overnight). Benzene and hydrogen bromide were then distilled from the mixture. The last traces were removed in a stream of nitrogen until the reaction mixture remaining attained a constant weight. The product yield was 247 g., 100 percent yield based upon desired 2,4-diphenoxybromobenzene, the anticipated product. Gas phase chromatography showed 99+ percent purity of product. Analysis showed:

Calculated for diphenoxybromobenzene: wt. percent C, 63.36; wt. percent H, 3.84. Found: wt. percent C, 63.48; wt. percent H, 3.96.

EXAMPLE 2

The run of Example 1 was repeated, except that 1.45 moles bromine was used (2:1 mole ratio of bromine to 2,4-diphenoxybenzene). Gas phase chromatography showed two additional peaks which were not shown by the product of Example 1. The absence of polybromination products in Example 1 indicates that one type of carbon atom in meta-diphenoxybenzene is more readily brominated than the others. Thus, a mixture of monobromination isomers should not be formed.

EXAMPLE 3

To a reaction vessel fitted with reflux condenser and stirring was added a solution of 37.6 g. (0.4 mole) phenol in 250 ml. pyridine, at room temperature. The reaction vessel was flushed with a stream of nitrogen and the reaction mixture was maintained under a nitrogen atmosphere during the entire time in the reaction vessel. Then, under agitation, 19.5 g. (0.36 mole) sodium methylate were added slowly to give a pale yellow solution. This solution was heated to reflux temperature and refluxed for 1.5 hours. Then, 160 ml. of methanol-pyridine mixture were disttilled out, through a Vigreux column replacing the reflux condenser, over a period of 1.5 hours. When the mixture then in the flask cooled below boiling, the reflux condenser was replaced. Then, 34.1 g. (calculated as 0.1 mole 2,4-diphenoxybromobenzene) of the product of Example 1 were poured into the reaction mixture, along with 50 ml. pyridine. This addition was followed by 2 g. cuprous chloride (catalyst). The reaction mixture was refluxed for 17 hours.

After that period of time, the reaction mixture was poured into a solution of 150 ml. concentrated HCl in 500 ml. water. The organic layer was extracted into 100 ml. benzene. The layers (phases) were separated and the aqueous layer was washed with 50 ml. benzene. This benzene extract was combined with the initial benzene extract. The combined benzene extracts were washed with 100 ml. of an aqueous 10% sodium hydroxide solution and with two 100 ml. portions of aqueous 10% sodium chloride solution. Benzene was removed by distillation at atmospheric pressure. Under vacuum distillation, a fraction boiling at 209–212° C. at 0.35 mm. mercury pressure was obtained (14.8 g. 42% yield), which was 99% pure by gas phase chromatographic analysis. The product (solid) was recrystallized from hot n-heptane to yield a material melting at 61.5–62.0° C. This material, believed to be 1,2,4-triphenoxybenzene, analyzed as follows:

Calculated for triphenoxybenzene: C, 81.28%; H, tographic analysis. The product (solid) was recrystallized 5.13%. Found: C, 81.25%; H, 5.21%.

The known linear polyphenylethers having four benzene rings and having a meta-benzene ring melt at 40° C. when the other ring is meta, at 48° C. when the other ring is para, and at 74° C. when the other ring is ortho. Accordingly, as the product of Example 3 melts at 61.5–62.0° C., it cannot be a linear polyphenylether and must be a triphenoxybenzene. Therefore, the bromine of the product of Example 1 must have gone into the middle ring of meta-diphenoxybenzene.

Of the three possible isomers of triphenoxybenzene, 1,3,5-triphenoxybenzene is at once eliminated as the product of Example 3, as it melts at 112° C. [ Ber., 38, 2212 (1901)].

Selection between the two remaining isomers possible was made on the basis of the nuclear magnetic resonance spectrum. 2,6-diphenoxybromobenzene has no hydrogen atoms to be shifted downfield by an ortho bromine atom, whereas 2,4-diphenoxybromobenzene has such a hydrogen atom. The downfield shift of this hydrogen was observed for the product of Example 1. All three hydrogen atoms on the middle ring were accounted for. The observed spectrum could not have been generated by such symmetrical molecules as 2,6-diphenoxybromobenzene and 3,5-diphenoxybromobenzene. On the other hand, the observed nuclear magnetic resonance spectrum of the product of Example 1 satisfied, in all respects, the requirements for 2,4-diphenoxybromobenzene.

EXAMPLE 4

In a manner similar to that described in Example 1, using a glass reaction vessel, meta-diphenoxybenzene is reacted with chlorine (instead of bromine) to effect monochlorination to 2,4-diphenoxychlorobenzene. This compound has kinematic viscosity characteristics in the lubricant range. KV at 100° F. is 26.49 cs. and at 210° F., 3.48 cs. The latter value is higher than that of o-diphenoxybenzene (KV at 210° F. is 2.98 cs.)

Although the present invention has been described with preferred embodiments, it is to be understood that modifications and variations may be resorted to, without departing from the spirit and scope of this invention, as those skilled in the art will readily understand.

What is claimed is:

1. A compound selected from the group consisting of 2,4-diphenoxybromobenzene and 2,4-diphenoxychlorobenzene.

References Cited

UNITED STATES PATENTS

| | | | |
|---|---|---|---|
| 2,028,081 | 1/1936 | Stoesser | 260—612 |
| 2,940,929 | 6/1960 | Diamond | 260—613 XR |

BERNARD HELFIN, *Primary Examiner.*

U.S. Cl. X.R.

252—54

PO-1050
(5/69)

UNITED STATES PATENT OFFICE
CERTIFICATE OF CORRECTION

Patent No. 3,449,442      Dated July 15, 1969

Inventor(s) ALBERT L. WILLIAMS

It is certified that error appears in the above-identified patent and that said Letters Patent are hereby corrected as shown below:

Column 2, line 60:    Delete "tographic analysis. The product (solid) was re-crystallized"

SIGNED AND
SEALED
NOV 18 1969

(SEAL)
Attest:

Edward M. Fletcher, Jr.
Attesting Officer

WILLIAM E. SCHUYLER, JR.
Commissioner of Patents